Aug. 16, 1949.  H. W. SHEPLER  2,478,948
PUSHER ATTACHMENT FOR ANY ROW CROP TRACTOR
Filed Feb. 24, 1947
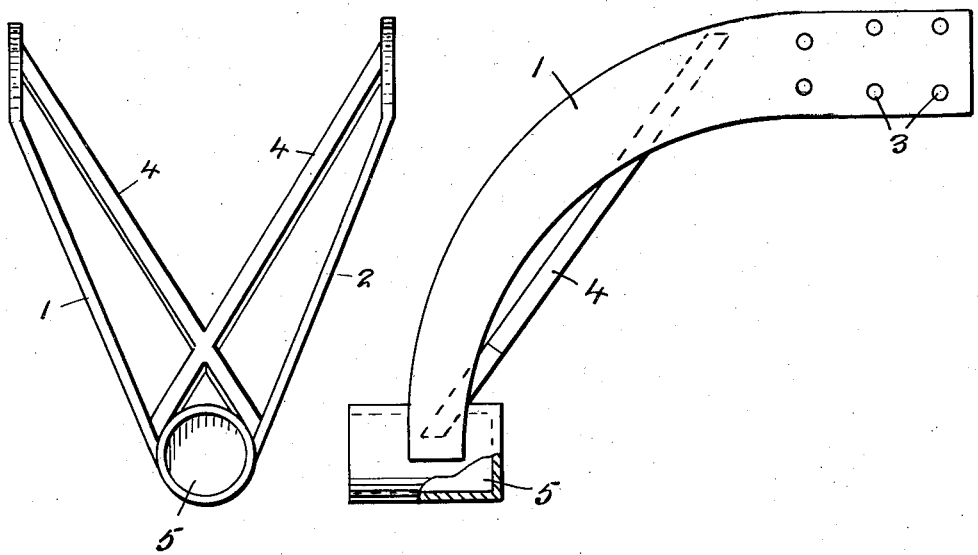
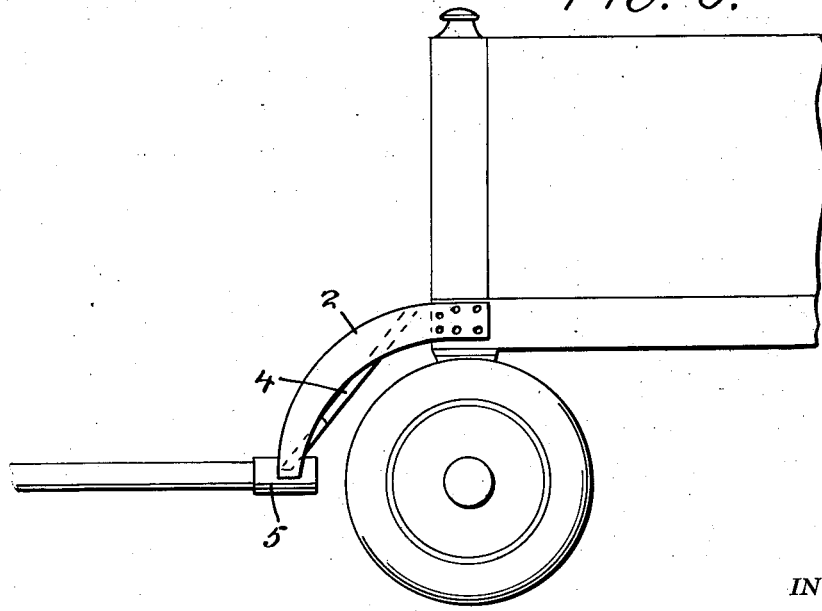
INVENTOR.
HOWARD W. SHEPLER
BY Victor J. Evans & Co.
ATTORNEYS Patented Aug. 16, 1949

2,478,948

UNITED STATES PATENT OFFICE 2,478,948

PUSHER ATTACHMENT FOR ANY ROW CROP TRACTOR

Howard W. Shepler, Womelsdorf, Pa.

Application February 24, 1947, Serial No. 730,498

1 Claim. (Cl. 280—33.13)

1

This invention relates to improvements in devices adapted to be attached to automotive vehicles for pushing other vehicles, such as farm machinery from place to place.

It is an object of the invention to provide a device which can be mounted on a row crop tractor and adapted for many operations, such as pushing machinery into a barn. Since most farmers are getting rid of horses, it is necessary to have some means for pushing machinery around. The means herein disclosed eliminates the danger of injuring a man when the machine he is pushing gets away. Also, since most insurance companies do not allow tractors in a barn, the pusher enables a wagon or machine to be moved to the doors of a barn by a tractor without necessitating the entrance of the tractor in the barn.

A further object is to provide a pusher which can be quickly and conveniently bolted to the front end of any type of farm tractor for moving machinery or other devices about a farm.

The above and other objects are attained by the novel construction and arrangement of parts hereinafter described and illustrated by the accompanying drawings, forming a part hereof, and in which:

Fig. 1 is a plan view of a pusher embodying the invention.

Fig. 2 is a side view of the device.

Fig. 3 is a side view showing the pusher attached to a tractor.

Referring to the drawings, the pusher is shown to comprise a pair of metal arms 1 and 2, which are arcuate and provided with a plurality of holes 3 to receive bolts for attachment to the front of a tractor or other vehicle.

The pusher is strengthened by a pair of braces 4 welded or otherwise secured to the arms 1 and 2.

At the lower ends of the arms 1, 2, there is secured thereto by welding or other means a cup shaped member 5, having its front end open and the rear end closed.

In practice, the device can be attached to a tractor, truck or any other vehicle conveniently

2 by manipulating a few bolts. The pusher enables various kinds of farm machinery to be moved to a barn without requiring a tractor to enter the barn. Also, there is no danger of an operator being injured in moving farm machinery from place to place.

The structure of the device is obviously simple, and inexpensive to manufacture, with practically no parts to get out of order. The device is not only useful on farms, but can be used in many situations where it is necessary to move machinery about. Manual labor is eliminated and also the danger of injury to workmen.

The above description is to be considered as illustrative and not limitative of the invention, of which modifications can be made without departing from the spirit and scope of the invention.

The invention, having been described, what is claimed is:

A pushing device, comprising a pair of arcuate arms, a straight portion of the rear end of each arm, a plurality of openings in said straight portion to receive fastening means whereby said arms are fastened to an automotive device, braces attached to the arms at their forward ends and to the straight portions at their rear ends, said braces being connected to each other adjacent their forward ends for the strengthening thereof, and a cup shaped member attached to the forward end of the arms, in horizontal relation thereto and intermediate of the forward ends of the braces.

HOWARD W. SHEPLER.

REFERENCES CITED

The following references are of record in the file of this patent:

UNITED STATES PATENTS

| Number | Name | Date |
|---|---|---|
| 1,199,613 | Richardson | Sept. 26, 1916 |
| 1,420,106 | Irwin | June 20, 1922 |
| 2,225,393 | Ray | Dec. 17, 1940 |